United States Patent [19]

Tamura

[11] Patent Number: 5,025,490

[45] Date of Patent: Jun. 18, 1991

[54] CATHODE-RAY TUBE WITH ITS DISPLAY FRONT PROTECTED FROM UNDESIRABLE ELECTRIFICATION

[75] Inventor: Katsuyoshi Tamura, Mobara, Japan

[73] Assignee: Hitachi, Ltd., Tokyo, Japan

[21] Appl. No.: 400,000

[22] Filed: Aug. 29, 1989

[30] Foreign Application Priority Data

Sep. 19, 1988 [JP] Japan ..................... 63-232301

[51] Int. Cl.$^5$ ..................... H01J 29/87; H04N 5/65

[52] U.S. Cl. ..................... 313/479; 313/478; 358/247

[58] Field of Search ..................... 313/478, 479; 358/245, 358/247, 246, 255; 174/35 MS File

[56] References Cited

U.S. PATENT DOCUMENTS

| | | | |
|---|---|---|---|
| 3,996,491 | 12/1976 | Larson et al. | 313/479 |
| 4,031,553 | 6/1977 | Sumigoshi et al. | 358/247 |
| 4,804,883 | 2/1989 | Müller et al. | 313/478 |

FOREIGN PATENT DOCUMENTS

| | | |
|---|---|---|
| 131356 | 8/1987 | Japan . |
| 19755 | 2/1988 | Japan . |

*Primary Examiner*—Sandra L. O'Shea
*Assistant Examiner*—Diab Hamadi
*Attorney, Agent, or Firm*—Antonelli, Terry, Stout & Kraus

[57] ABSTRACT

A cathode-ray tube has an electrically conductive film formed over the surface of the panel portion of the tube, a transparent, electrical insulating layer formed on the conductive film and an electrode unit formed on the electrical insulating layer. The electrode unit is connected with a common potential line. A capacitor formed between the anode of the cathode-ray tube and the conductive film and a capacitor formed by the conductive film insulating layer and the electrode unit are electrically in series connection as viewed from a source for the voltage to be applied to the anode.

23 Claims, 4 Drawing Sheets

CATHODE-RAY TUBE WITH ITS DISPLAY FRONT PROTECTED FROM UNDESIRABLE ELECTRIFICATION

BACKGROUND OF THE INVENTION

This invention relates to suppression of undesirable electrification tending to occur at an outer surface of a display front of a cathode-ray tube which can be used as, for example, a picture tube of a television receiver, a display unit in a terminal equipment of a computer or a display unit of an oscilloscope.

In a cathode-ray tube in which a phosphor screen (a metal back film) formed on an inner surface of a glass bulb is scanned by an electron beam, the phosphor screen is maintained at a potential of an anode supplied with a high voltage. Consequently, an outer surface of a panel portion of the glass bulb tends to be electrified and will have a high potential which will provide various adverse effects such as impartation of electric shocks to a user or viewer and generation of electric discharge causing mal-operation of electronic equipments located in the neighborhood of the cathode-ray tube.

Various proposals were made in the past so as to deal with such problems. For example, JP-U-62-131356 (laid open on Aug. 19, 1987) and JP-U-63-19755 (laid open on Feb. 9, 1988) disclose a cathode-ray tube of a type having a front glass layer provided on an outer surface of a panel portion of the tube. In the disclosed cathode-ray tube, a transparent, electrical conductive film is formed on a surface of the front glass layer opposite to the panel portion or on the outer surface of the panel portion, and this electrical conductive film is grounded so as to prevent appearance of a high potential at the outer surface of the display front of the cathode-ray tube.

SUMMARY OF THE INVENTION

It is an object of the present invention to provide a cathode-ray tube of a type having, for example, a transparent, electrical insulating layer provided on an outer surface of its panel portion to act as an anti-reflection layer, in which means are provided to prevent appearance of a high voltage at the outer surface of the insulating layer due to electrification.

According to one aspect, of the present invention, a transparent, electrical conductive film is fixed with respect to an outer surface of a panel portion of a glass bulb of a cathode-ray tube. The expression "fixed with respect to" means that the electrical conductive film may be formed on the outer surface of the panel portion or may be formed over the outer surface of the panel portion through an interposed transparent, insulating layer (e.g., a glass layer). A transparent, electrical insulating layer which acts as, for example, an anti-reflection layer is provided on the electrical conductive film. An electrode unit is formed on the electrical insulating layer provided on the electrical conductive film. This electrode unit is disposed at a location which will not obstruct observation of a picture by a viewer. This electrode unit is connected to a common potential line for the anode voltage of the cathode-ray tube. Thus, the combination of the electrode unit, the conductive film and the insulating layer interposed therebetween forms a capacitor. When viewed from a power source supplying the anode voltage, this capacitor is electrical connected in series with another capacitor formed by the combination of the conductive film, the underlying insulating layer including the panel portion (of glass) and the anode (a metal back layer). Therefore, when the capacitance of the former capacitor is selected to be sufficiently larger than that of the latter capacitor, undesirable electrification tending to occur at the outer surface of the panel portion or the display front of the cathode-ray tube can be suppressed.

DESCRIPTION OF THE PREFERRED EMBODIMENTS

Figure 1:
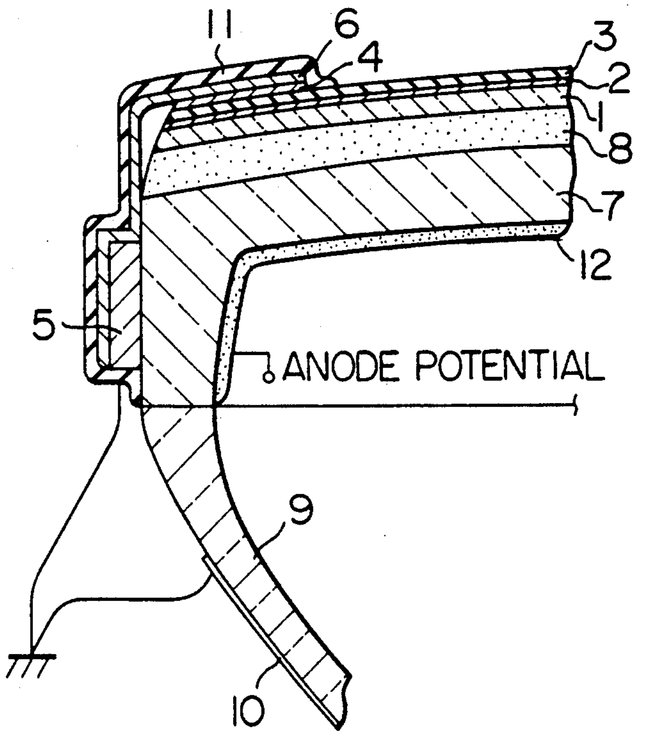
FIG. 1 is a schematic sectional view of a part of an embodiment of the cathode-ray tube according to the present invention.

FIG. 1 is a schematic sectional view of a panel portion and its adjoining parts in an embodiment of the cathode-ray tube having an anti-reflection layer provided according to an embodiment of the present invention. Referring to FIG. 1, a transparent, electrical insulating layer (e.g., glass layer) 1 is bonded by a layer of a bonding agent (a resin) 8 to an outer surface of the panel portion 7 of a glass bulb of the cathode-ray tube. A transparent, electrically conductive film (for example, an ITO film, i.e., indium oxide-tin oxide film) 2 is provided on the electrical insulating layer 1, and an anti-reflection layer 3 is provided on the conductive film 2. Further, an electrode unit 4 is provided on the anti-reflection layer 3 at a location which will not obstruct observation of a picture by a user or a viewer. A tension band 5 is provided around a skirt of the panel portion 7, and an electrical conductive adhesive tape 6 electrical connects the electrode unit 4 with a common potential line such as a grounding conductor. Because the tension band 5 is usually electrical conductive and connected with the common potential line such as the grounding conductor, the conductive adhesive tape 6 is provided so as to be attached to both the electrode unit 4 and the tension band 5 thereby to electrical connect them. The glass bulb includes a funnel portion 9, and a graphite outer coating 10 is provided to partly cover the outer surface of the funnel portion 9. In the illustrated arrangement, both the tension band 5 and the graphite outer coating 10 are grounded. During operation of the cathode-ray tube, a voltage substantially equal to the anode voltage is applied to a metal back layer 12 in the phosphor screen formed on the inner surface of the panel portion 7. The resin layer 8 and the transparent insulating layer 1 are not necessarily essentially required in the cathode-ray tube of the present invention.

Figure 3:
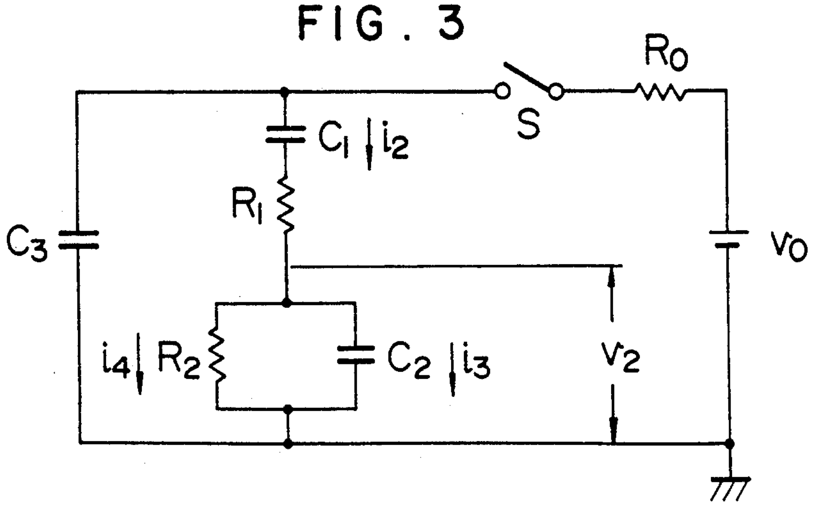
FIG. 3 is an equivalent circuit diagrams for illustrating the operation of the cathode-ray tube embodying the present invention.

FIG. 3 shows an equivalent circuit of the principal parts of the embodiment of the cathode-ray tube shown in FIG. 1. In FIG. 3, the symbol $v_0$ designates a power source voltage supplying the anode voltage, and $R_0$ designates an internal resistance of the power source. The symbol $C_1$ designates a capacitance formed between the ITO film (indium oxide-tin oxide film) 2 and the metal back layer 12 at the anode potential, and $R_1$ designates the resistance of the ITO film 2. This resistance $R_1$ is electrical connected in series with the capacitance $C_1$, and a current $i_2$ flows through the capacitance $C_1$ and the resistance $R_1$ connected in Series. The symbol $C_2$ designates a capacitance formed between the ITO film 2 and the electrode unit 4, and, when viewed from the power source having the voltage $v_0$, this capacitance $C_2$ is electrical connected in series with the capacitance $C_1$. The symbol $R_2$ designates a leakage resistance between the ITO film 2 and the electrode unit 4, and this leakage resistance $R_2$ is electrical connected in parallel with the capacitance $C_2$. The symbol $C_3$ designates the capacitance of the graphite outer coating 10. This capacitance $C_3$ forms part of a high voltage rectifier circuit. A voltage $v_2$ applied across the capacitor $C_2$ formed by the combination of the ITO film 2 and the electrode unit 4 corresponds to a voltage which imparts electric shocks to the user or viewer. When this voltage $v_2$ is excessively high, dielectric breakdown occurs in the anti-reflection layer 3 interposed between the ITO film 2 and the electrode unit 4, and the ITO film 2 will be destroyed at the same time. In the equivalent circuit shown in FIG. 3, the factors other than the capacitance $C_2$ and the resistance $R_2$ are determined by both the cathode-ray tube and the television set in which the cathode-ray tube is incorporated. Therefore, it is necessary to set the peak value of the voltage $v_2$ as low as possible by suitably selecting the values of both the capacitance $C_2$ and the resistance $R_2$.

A transient phenomenon occurring in response to the turn-on of a switch S in FIG. 3 (that is, when the cathode-ray tube starts to operate) is solved for $v_2$, as follows:

$$R_0^2 c_3^2 R_1 c_2 \frac{d^3 v_2}{dt^3} + R_0 c_3 \left\{ R_0 c_3 \left(1 + \frac{R_1}{R_2}\right) + \frac{c_2 R_0}{c_1}(c_1 + c_3) + R_1 c_2 \right\} \frac{d^2 v_2}{dt^2} + R_0 \left\{ (c_1 + c_3)\frac{R_0 c_3}{c_1 R_2} + \frac{c_2 c_3}{c_1} + \left(1 + \frac{R_1}{R_2}\right) c_3 \right\} \frac{dv_2}{dt} + \frac{R_0 c_3}{c_1 R_2} v_2 = R_0 c_3 \frac{dv_0}{dt}$$

In the initial condition at time $t=0$, $v_2=0$, $$\frac{dv_2}{dt^2} = 0, \frac{d^2 v_2}{dt^2} = \frac{v_0}{R_1 R_2 C_1 C_3}.$$

Figure 4B:
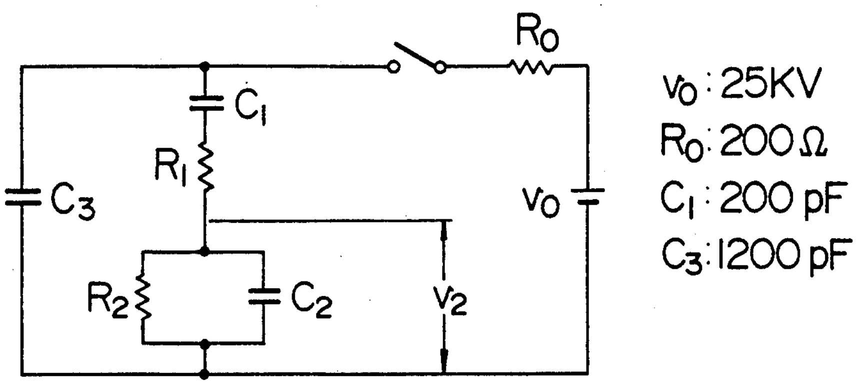
FIG. 4A is a graph showing how the voltage appearing at the electrode unit of the cathode-ray tube embodying the present invention as shown in FIG. 4B changes relative to time.
Figure 4A:
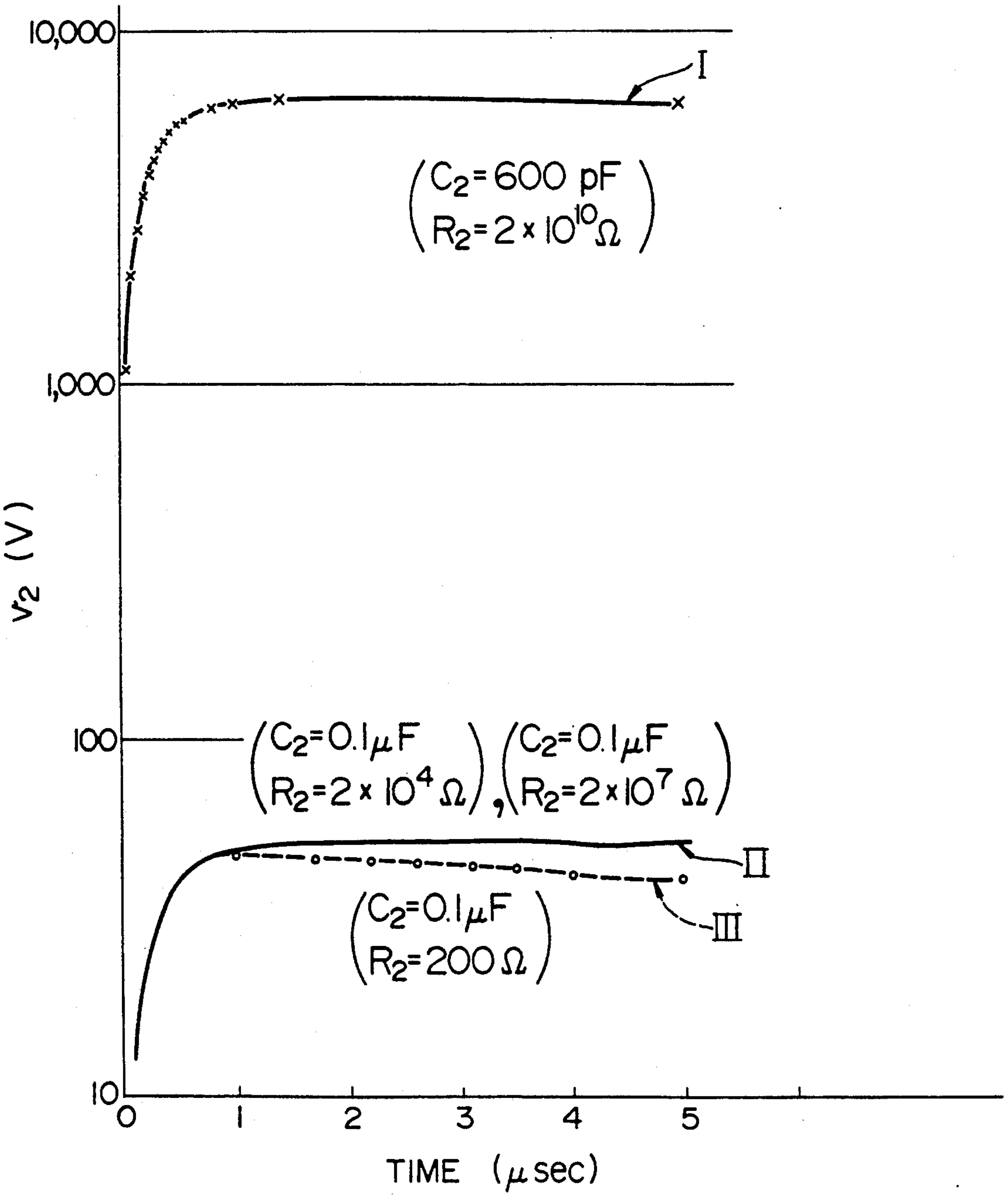

The above equation is solved while changing the values of $C_2$ and $R_2$ which are the parameters. FIG. 4 shows the voltage $v_2$ (which appears at the outer surface of the display front of the cathode-ray tube) changes relative to time. The resistance $R_2$ is a leakage resistance between the ITO film 2 and the electrode unit 4, as described already. Therefore, this leakage resistance $R_2$ will not be so small and is generally about $2\times10^{10}\ \Omega$. For the sake of comparison, the minimum value of this resistance $R_2$ is set at 200 $\Omega$and the other constants are set at the same values as those used in a 14-inch cathode-ray tube. In FIG. 4A, the curve I represents the case where the electrode unit 4 is eliminated, and the conductive bonding tape 6 is directly provided on the anti-reflection layer 3. On the other hand, the curves II and III represent the case where the electrode unit 4 is formed of graphite, and the conductive bonding tape 6 is provided on the electrode unit 4. As will be seen from FIGS. 4A and 4B, the capacitance $C_2$ is an especially important factor, and the peak value of the voltage $v_2$ is almost determined by the value of $C_2$. The resistance $R_2$ defines the period of time elapsed until the voltage $v_2$ drops to zero with gradual discharge of the charged capacitor $C_2$. It is apparent that any practically serious problem will not arise even when the resistance $R_2$ may be infinite ($\infty$), because the potential $v_2$ is sufficiently low when the capacitance $C_2$ is sufficiently large.

In this case, the value of $v_2$ is equal to that obtained by dividing the power supply voltage $v_0$ by the series connection of the capacitances $C_1$ and $C_2$. That is, the value of $v_2$ is given by $$v_2 = \frac{C_1 v_0}{C_1 + C_2},$$

and it will be seen that the larger the value of $C_2$ as compared to that of $C_1$, the value of $v_2$ becomes smaller. Practically, it is necessary that the value of $v_2$is to be smaller than the dielectric breakdown voltage of the anti-reflection layer 3. For example, when the thickness of the anti-reflection layer 3 is 3,000 Å, the dielectric breakdown starting voltage of the anti-reflection layer 3 is about 120 V. Therefore, the value of $C_2$ is increased so that the value of $v_2$ may not exceed the level of the breakdown starting voltage described above. That is, the contact area of the electrode unit 4 in contact with the anti-reflection layer 3 is to be increased. Further, when the leakage resistance $R_2$ is sufficiently small, the peak value of $v_2$ can be decreased as shown in FIG. 4A.

Figures 5A, 5B:
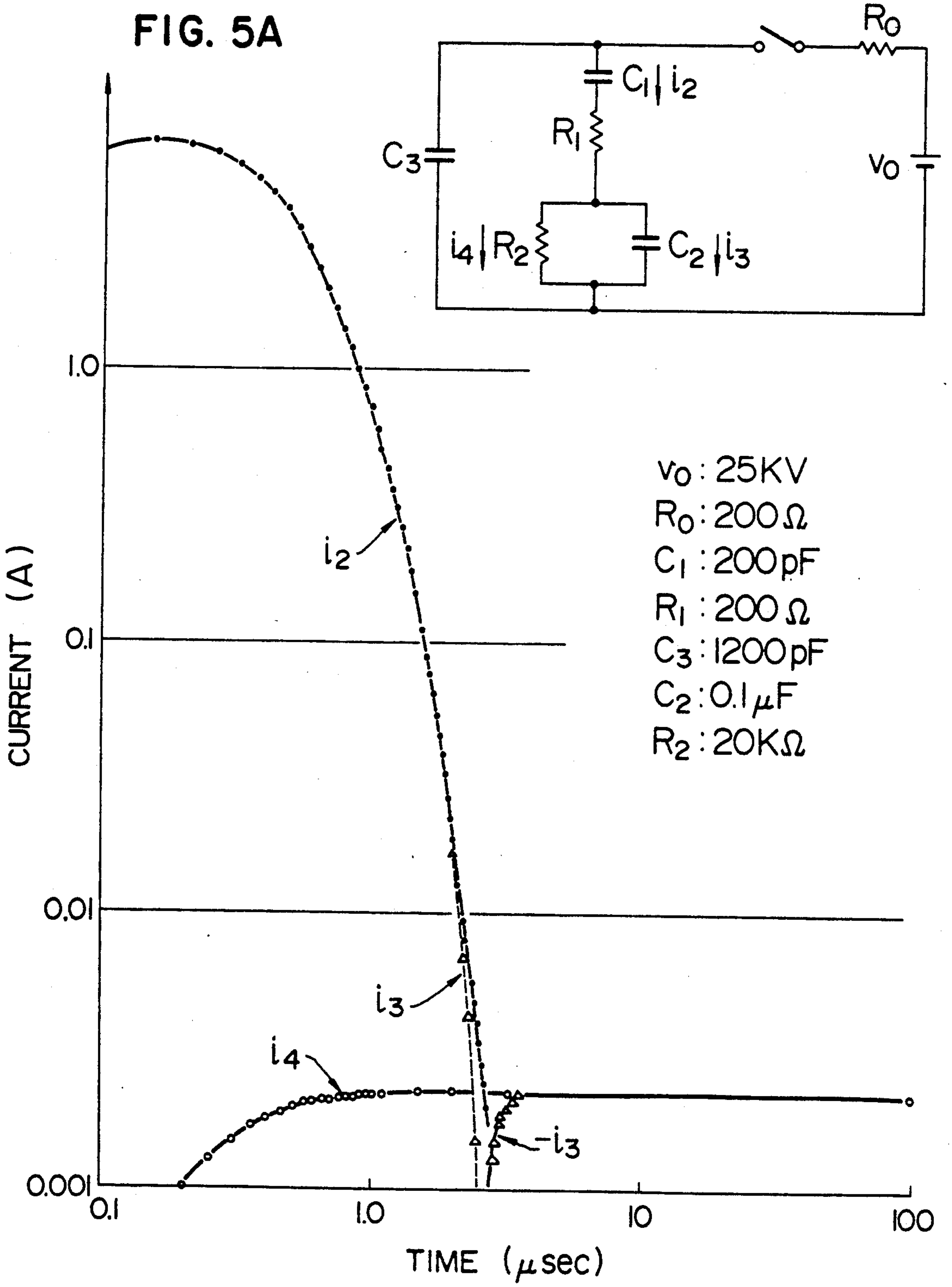
FIG. 5A is a graph showing how currents flowing through various parts change relative to time when the cathode-ray tube embodying the present invention as shown in FIG. 5B starts to operate.

The breakdown starting voltage of the anti-reflection layer 3 has the value of 120 V described above when a d.c. voltage is applied. On the other hand, an effective breakdown starting voltage will be higher with respect to a fast-changing electrification preventing current. For example, under conditions as shown in FIG. 5A, the effective breakdown starting voltage increases up to a level about ten times as high as the value of 120 V and has now a value of about 1,200 V. Therefore, in this case, the ratio between the capacitances $C_1$ and $C_2$ may be set to be at least about 1:20.

FIGS. 5A and 5B show how the current $i_1$ giving rise to electrification of the outer surface of the display front of the cathode-ray tube changes when the switch S is turned on. In FIG. 5, the values of $C_2$ and $R_2$ are selected to be $C_2=0.1\ \mu F$ and $R_2=20\ k\Omega$ in a typical case in which graphite is used to form the electrode unit 4. It will be seen from FIGS. 5A and 5B that the greater portion of the current $i_2$ flows through the capacitance $C_2$, and the resistance $R_2$ acts to discharge the capacitance $C_2$ after it has been charged up. Thus, when the parallel circuit consisting of the capacitance $C_2$ between the electrode unit 4 and the ITO film 2 and the leakage resistance $R_2$ therebetween is connected in series relation with the capacitance $C_1$ when viewed from the power source having the power supply voltage $v_0$, a discharge path for the charges giving rise to electrification of the outer surface of the display front of the cathode-ray tube is established. Thus, the capacitor $C_2$ acts as an especially important element.

Figure 2A:
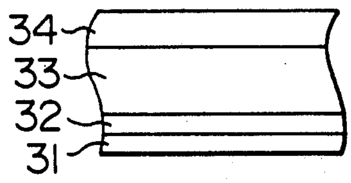
FIGS. 2A and 2B are schematic sectional views showing two forms of the structure of the anti-reflection layer employed in the embodiment shown in FIG. 1.

FIG. 2A shows one form of the structure of the anti-reflection layer. In the form shown in FIG. 2A, four layers 31 to 34 having respectively different thicknesses and refractive indices are laminated. The principal components and thicknesses of the individual layers are enumerated, by way of example, as follows:

| | Principal component | Thickness (Å) |
|---|---|---|
| Layer 31 | $Pr_6O_{11}$ and $TiO_2$ | 200 |
| Layer 32 | $MgF_2$ | 300 |
| Layer 33 | $Pr_6O_{11}$ and $TiO_2$ | 2,000 |
| Layer 34 | $MgF_2$ | 1,125 |

Figure 2B:
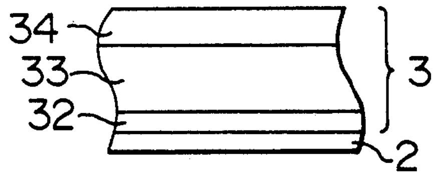

FIG. 2B shows one form of the structure of the anti-reflection layer 3 employed in the embodiment shown in FIG. 1. The layer 3 shown in FIG. 2B is formed by laminating the three layers 32 to 34 described above, and the materials and thicknesses of these layers 32 to 34 are the same as those described with reference to FIG. 2A. The thickness of the ITO film 2 may be selected to be equal to that of the layer 34. The ITO film 2 cooperates with the anti-reflection layer 3 to exhibit the light reflection preventive effect.

The electrode unit 4 forming the capacitor $C_2$ together with the ITO film 2 may be formed of any one of materials which have affinity or wettability enough to make intimate contact with the anti-reflection layer 3 and which provide the required capacitance. For example, the material may be any one of graphite pastes (in which graphite particles having a grain size of, for example, 1 μm or less are dispersed in an epoxy resin, a phenolic resin, a silicone resin, an acrylic resin and the like), a silver paste (in which silver particles having a grain size of, for example, 5 or 6 μm are dispersed in an organic resin), an aluminum paste (in which aluminum particles having a grain size of, for example, 5 or 6 μm are dispersed in an organic resin), etc. The electrical conductive materials to be contained in these electrical conductive pastes need not be particles but may be fine fibers. Among the pastes described above, employment of the graphite paste containing the graphite particles having the grain size smaller than the others is especially advantageous in that the graphite particles can permeate through pinholes of the anti-reflection layer 3 to make electrical contact with the ITO film 2 thereby providing the leakage resistance $R_2$ connected in parallel with the capacitance $C_2$, so that the charges accumulating in the capacitor $C_2$ can be successfully discharged. However, this electrical contact between the graphite particles and the ITO film 2 to provide the leakage resistance as described above is not necessarily essentially required, and an essentially required condition is that the capacitance value of the capacitor $C_2$ is sufficiently large relative to that of the capacitor $C_1$. For example, the capacitance value of the capacitor $C_2$ may be more than twenty times as large as that of the capacitor $C_1$. The electrode unit 4 may be provided on an assembly formed by integrally laminating the transparent insulating layer 1, the ITO film 2 and the anti-reflection layer 3, and, the assembly having the electrode unit 4 formed thereon may then be provided on the panel portion 7 of the glass bulb of the cathode-ray tube. However, the electrode unit 4 may be simultaneously formed in the step of heating in which the assembly consisting of the transparent insulating layer 1, the ITO film 2 and the anti-reflection layer 3 is bonded by the resin 8 to the panel portion 7 of the cathode-ray tube. However, the resin 8 used to bond the assembly to the panel portion 7 of the cathode-ray tube has usually a low viscosity before the resin 8 is thermally set. Therefore, in the case of the simultaneous formation of the electrode unit 4 described above, it is necessary to pay sufficient attention so that the resin 8 may not be mixed with the conductive paste forming the electrode unit 4. Accordingly, it is preferable that, before the assembly is fixed to the panel portion 7, the electrode unit 4 is formed by coating, drying and curing the conductive paste.

The electrode unit 4 formed on the anti-reflection layer 3 is conveniently electrical connected with the common potential line (which is grounded) by connecting the electrode unit 4 to the tension band 5 connected with the common potential line. The conductive bonding tape 6 can be conveniently used to electrical connect the electrode unit 4 to the tension band 5. The conductive bonding tape 6 is furnished in a variety of kinds including a tape in the form of a copper foil coated with an electrical conductive bonding agent, a tape in the form of an aluminum foil coated with an electrical conductive bonding agent, and an electrical conductive tape which exhibits a bonding property when heated.

Further, as shown in FIG. 1, a protective tape 11 covering the conductive adhesive tape 6 may be provided so as to protect the tape 6. For example, an electrical insulating bonding tape type No. 10 made by the 3M company may be used as this protective tape.

The above description has principally referred to the cathode-ray tube provided with the transparent insulating layer (e.g., a glass layer) 1. However, it is apparent that the present invention is equally effectively applicable to a cathode-ray tube which is not provided with such a layer.

Figure 6:
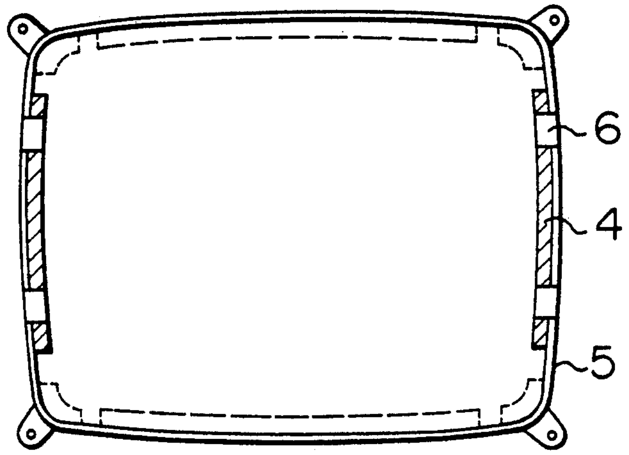
FIG. 6 is a front elevation view showing an application of the present invention to a 14-inch cathode-ray tube.

FIG. 6 is a front elevation view of a 14-inch cathode-ray tube to which the present invention is applied. In the cathode-ray tube shown in FIG. 6, the electrode unit 4 includes two electrodes formed along the edges of the shorter sides of the outer surface of the panel portion. However, the electrode unit 4 may include a plurality of electrodes formed along the edges of the longer sides, four corners or all the sides. When graphite is used to form the electrodes, its thickness may be suitably selected so as not to be easily stripped off and so as not to impair the external appearance. In the case of formation of such graphite electrodes, the graphite is preferably coated by a printing method from the aspect of external appearance and so as to make uniform both the film thickness and the film surface.

Figure 7:
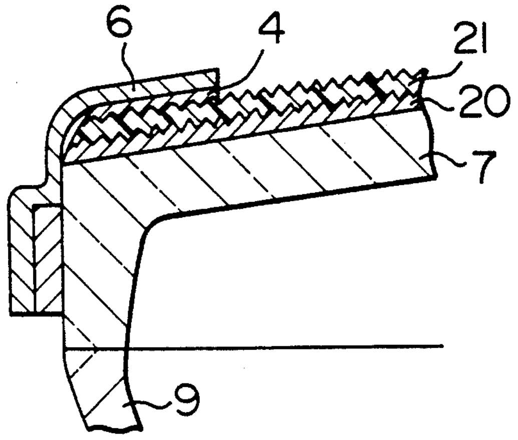
FIG. 7 is a schematic sectional view of a part of another embodiment of the present invention.

FIG. 7 is a schematic sectional view of a panel portion and its adjoining parts in another embodiment of the cathode-ray tube of the present invention. Referring to FIG. 7 showing a modification of the embodiment shown in FIG. 1, a transparent, electrical conductive film 20 having a roughened surface is provided to cover the entirety of the outer surface of the panel portion 7 of the cathode-ray tube. For example, this transparent conductive film 20 is formed by spraying, onto the outer surface of the panel portion 7, a solution which is a mixture of 89.99 wt % of ethyl alcohol, 0.01 wt % of hydrochloric acid, 7.5 wt % of pure water, etc. and which contains fine particles of 1.52 wt % of $SnO_2$ and 0.08 wt % of $Sb_2O_3$ having a grain size of 50 Å to 100 Å dispersed therein. The conductive film 20 has a thickness of 1,000 Å to 5,000 Å, and its sheet resistance is not larger than $10^9$ Ω/□ and typically about 106 to 109 Ω/□. Provided on the conductive film 20 is a transparent, electrical insulating layer 21 having a roughened surface. For example, this insulating layer 21 is formed by spraying, onto the conductive film 20, a solution which is a mixture of 7.51 wt % of ethyl silicate, 74.07 wt % of ethyl alcohol, 0.89 wt % of nitric acid, 8.43 wt % of isopropyl alcohol, 1.39 wt % of methyl ethyl ketone ($CH_3CH_2COCH_3$) pure water, etc. This insulating layer 21 has a thickness of 1,000 Å to 5,000 Å, and its sheet resistance is not smaller than $10^{10}$ Ω/□ and typically about 1010 to $10^{14}$ Ω/□. When, after spraying the solutions providing the conductive film 20 and insulating layer 21 respectively, the coated solutions are heated up to about 160° C. for about 60 minutes, the solvents are vaporized, with the result that the conductive film 20 is composed of a mixture of $SnO_2$ or $Sb_2O_3$ and $SiO_2$, while the insulating layer 21 is composed of $SiO_2$ only.

As in the case of the first embodiment, the electrode unit 4, the conductive adhesive tape 6 (and the protective tape 11 as the case demands), are provided on the insulating layer 21. Therefore, the arrangement and materials of the electrode unit 4, the conductive adhesive tape 6 (and the protective tape 11) are similar to those described already with reference to FIGS. 1 to 6.

In the embodiment shown in FIG. 7, the combination of the conductive film 20 having a roughened surface and the insulating layer 21 also having a roughened surfacer provides a light reflection preventing function. However, the surface of the conductive film 20 may not necessarily be roughened.

I claim:

1. A cathode-ray tube including an anode to be supplied with a high voltage in operation, comprising:
   - a glass bulb having a panel portion;
   - a transparent, electrical conductive film fixed with respect to an outer surface of said panel portion;
   - a transparent, electrical insulating layer provided on said conductive film; and
   - an electrode unit provided on said insulating layer and electrical connected with a common potential line, said high voltage being established with respect to said common potential, said electrode unit, said electrical insulating layer and said electrical conductive film forming a capacitor.

2. A cathode-ray tube according to claim 1, in which said electrode unit, said insulating layer and said conductive film additionally form a resistor in parallel with said capacitor.

3. A cathode-ray tube according to claim 2, in which said electrode unit is made of a material having affinity with respect to said insulating layer for maximizing the contact area therebetween to provide a largest possible capacitance for said capacitor.

4. A cathode-ray tube according to claim 3, in which said material for said electrode unit is an electrical conductive paste containing electrical conductive particles or fine fibers.

5. A cathode-ray tube according to claim 4, in which said electrical conductive paste is made of epoxy resin, phenolic resin, silicone resin or acrylic resin into which graphite particles are dispersed so that the particles permeate said insulating layer through pinholes therein to provide said resistor.

6. A cathode-ray tube according to claim 3, in which said material for said electrode unit is an electrical conductive paste containing an organic resin and silver particles or aluminum particles dispersed therein.

7. A cathode-ray tube according to claim 1, further comprising means for connecting said electrode unit with said common potential line for said high voltage.

8. A cathode-ray tube according to claim 7, in which said electrode unit connecting means includes an electrical conductive tape.

9. A cathode-ray tube according to claim 7, in which said electrode unit connecting means includes an electrical conductive paste.

10. A cathode-ray tube according to claim 7, further comprising a protective tape covering said electrode unit connecting means.

11. A cathode-ray tube according to claim 1, in which said electrical insulating layer and said electrical conductive film serve as an anti-reflection layer.

12. A cathode-ray tube according to claim 11, in which said anti-reflection layer includes a lamination of a plurality of transparent films of different refractive indices.

13. A cathode-ray tube according to claim 11, in which said anti-reflection layer includes a transparent, electrical insulating layer having its surface roughened.

14. A cathode-ray tube according to claim 13, in which that surface of said conductive film on which said insulating layer is provided is also roughened.

15. A cathode-ray tube according to claim 1, further comprising another transparent, insulating layer provided between said panel portion and said transparent, electrical conductive film.

16. A cathode-ray tube according to claim 1, in which a capacitor formed between said transparent, electrical conductive film and said anode is electrically in series connection with said capacitor formed by said electrode unit, said electrical insulating layer and said electrical conductive film as viewed from a source for said high voltage.

17. A cathode-ray tube according to claim 16, in which the capacitance of said capacitor formed by said electrode unit, said electrical insulating layer and said electrical conductive film is at least 20 times as large as that of said capacitor formed between said transparent, electrical conductive film and said anode.

18. A cathode-ray tube according to claim 1, further comprising a tension band provided around a skirt of said panel portion, said electrode unit being electrical connected with said tension band.

19. A cathode-ray tube including an anode to be supplied with a high voltage in operation, comprising:
   - a glass bulb having a panel portion;
   - a first transparent, electrical insulating layer provided over an outer surface of said panel portion;
   - a transparent, electrical conductive film provided on said insulating layer;
   - a second transparent, electrical insulating layer provided on said conductive film;
   - an electrode unit provided on said second insulating layer;
   - a tension band provided around a skirt of said panel portion; and an electrical conductive adhesive tape attached on said electrode unit and said tension band and being electrical connected with a common potential line for said high voltage, said electrode unit, said second insulating layer and said electrical conductive film forming a capacitor.

20. A cathode-ray tube including an anode to be supplied with a high voltage in operation, comprising:

a glass bulb having a panel portion;

a transparent, electrical conductive film provided over the surface of said panel portion;

a transparent, electrical insulating layer provided on said conductive film, at least said insulating layer being roughened for preventing light reflection;

an electrode unit provided on said reflection preventing layer;

a tension band provided around a skirt of said panel portion; and an electrical conductive adhesive tape attached on said electrode unit and said tension band and being electrical connected with a common potential line for said high voltage, said electrode unit, said anti-reflection layer and said electrical conductive film forming a capacitor.

21. A cathode-ray tube according to claim 20, further comprising a protective tape covering said adhesive tape.

22. A cathode-ray tube according to claim 20, in which the sheet resistance of said electrical conductive film is not larger than $10^9$ Ω/square and the sheet resistance of said electrical insulating layer is not smaller than $10^{10}$ Ω/square.

23. A cathode-ray tube according to claim 22, further comprising a protective tape covering said adhesive tape.

* * * * *